(12) United States Patent
Liu et al.

(10) Patent No.: US 9,230,207 B2
(45) Date of Patent: Jan. 5, 2016

(54) RFID TAG AERIAL WITH ULTRA-THIN DUAL-FREQUENCY MICRO STRIP PATCH AERIAL ARRAY

(71) Applicants: Shanghai YAOCHUAN Information Technology CO., Ltd., Shanghai (CN); Xerafy Ltd (BVI), Tortola (VG)

(72) Inventors: Zhijia Liu, Shanghai (CN); Guohong Du, Chengdu (CN)

(73) Assignees: XERAFY LTD (BVI), Tortola (VG); SHANGHAI YAOCHUAN INFORMATION TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 14/367,599

(22) PCT Filed: Dec. 19, 2012

(86) PCT No.: PCT/CN2012/086952
§ 371 (c)(1),
(2) Date: Jun. 20, 2014

(87) PCT Pub. No.: WO2013/091548
PCT Pub. Date: Jun. 27, 2013

(65) Prior Publication Data
US 2014/0332598 A1 Nov. 13, 2014

(30) Foreign Application Priority Data
Dec. 20, 2011 (CN) .......................... 2011 1 0430823

(51) Int. Cl.
*G06K 19/06* (2006.01)
*G06K 19/077* (2006.01)
(Continued)

(52) U.S. Cl.
CPC .... *G06K 19/07786* (2013.01); *G06K 19/07754* (2013.01); *H01Q 1/2225* (2013.01); *H01Q 21/065* (2013.01); *H01Q 21/30* (2013.01)

(58) Field of Classification Search
CPC ............... G06K 19/07749; G06K 19/0723; G06K 19/07786; G06K 19/07754; H01Q 1/2225
USPC ........................................................ 235/492
See application file for complete search history.

(56) References Cited

U.S. PATENT DOCUMENTS

2006/0192718 A1* 8/2006 Ando et al. .................... 343/773
2007/0159400 A1* 7/2007 DeJean et al. ......... 343/700 MS
(Continued)

FOREIGN PATENT DOCUMENTS

CN 1822438 8/2006
CN 101924268 12/2010
(Continued)

OTHER PUBLICATIONS

Supplementary European Search Report issued in EP Application No. 12 85 9144 on Oct. 5, 2015.

*Primary Examiner* — Thien M Le
*Assistant Examiner* — Claude J Brown
(74) *Attorney, Agent, or Firm* — Scully Scott Murphy & Presser

(57) ABSTRACT

The present invention relates to a RFID tag antenna with ultra-thin dual-frequency micro strip patch antenna array, the RFID tag antenna comprises an units array (1), a substrate (2) and a substrate base plate (3); the radiation units array (1) is configured to be asymmetrically distributed around a chip; a first radiation unit (5) and a third radiation unit (7) form a low-frequency resonant system of the RFID tag antenna (9), and a second radiation unit (6) and a fourth radiation unit (8) form a high-frequency resonant system of the RFID tag antenna (9), thereby achieving a dual-frequency effect, and enabling the RFID tag antenna of the present disclosure to be compatible with both of the working frequency bands in Europe and in U.S., and thus achieving a dual-frequency-band property.

11 Claims, 1 Drawing Sheet

(51) Int. Cl.
*H01Q 1/22* (2006.01)
*H01Q 21/06* (2006.01)
*H01Q 21/30* (2006.01)

(56) References Cited

U.S. PATENT DOCUMENTS

| | | | |
|---|---|---|---|
| 2007/0279286 A1* | 12/2007 | Coutts et al. | 343/700 MS |
| 2008/0158085 A1* | 7/2008 | Lu et al. | 343/793 |
| 2008/0174505 A1* | 7/2008 | Wong et al. | 343/795 |
| 2008/0191945 A1* | 8/2008 | Taki et al. | 343/700 MS |
| 2008/0252529 A1* | 10/2008 | Rao et al. | 343/700 MS |
| 2009/0009399 A1* | 1/2009 | Gaucher et al. | 343/700 MS |
| 2009/0051599 A1* | 2/2009 | Fu et al. | 343/700 MS |
| 2009/0295645 A1* | 12/2009 | Campero et al. | 343/700 MS |
| 2010/0007570 A1* | 1/2010 | Sardariani et al. | 343/797 |

FOREIGN PATENT DOCUMENTS

| | | | |
|---|---|---|---|
| CN | 202503104 | 10/2012 | |
| EP | 1 942 553 A1 | 7/2008 | |
| EP | 1993167 | 11/2008 | |
| JP | 2005252853 A * | 9/2005 | H01Q 21/30 |

* cited by examiner

RFID TAG AERIAL WITH ULTRA-THIN DUAL-FREQUENCY MICRO STRIP PATCH AERIAL ARRAY

CROSS-REFERENCE TO RELATED APPLICATIONS

This application is an US national phase application of International Application No. PCT/CN2012/086952, filed on Dec. 19, 2012, which is based upon and claims priority to Chinese Patent Application No. 201110430823.4, filed on Dec. 20, 2011, the entire contents of which are incorporated herein by reference.

TECHNICAL FIELD

The present disclosure relates to a RFID tag antenna, and more particularly, to a RFID tag antenna with ultra-thin dual-frequency micro strip patch antenna array.

BACKGROUND

Radio Frequency Identification (RFID) is a non-contact automatic identification technology utilizing radio communication, which includes two main parts, i.e., an electronic tag and a reader. Non-contact data transmission is performed between the tag attached with codes and the reader through an antenna to realize an automatic identification process over a certain distance. In accordance with frequency bands, the current radio frequency identification systems may be divided into low-frequency systems (30~300 KHz), high-frequency systems (3~30 MHz) and ultra-high-frequency and microwave systems (300 MHz~3 GHz or greater than 33 GHz). As a basis for a fast, real-time and accurate information acquisition and processing high tech and standardization of messages, RFID has been known in worldwide as one of top ten most significant technology in this century. Because of the gradually matured standardization of the UHF frequency band in China, and requirements for applications such as logistics, smart transport and digital tourism, the share of UHF frequency band products in the market of the RID industry keeps increasing. RFID tag antennas and reader antennas, as an important communication tool, play significant roles in identification systems. In order to quickly read information on the tag over a long distance, systems with high frequency band attract more attention. Since a RFID tag antenna is the most variable part in a RFID system and the design thereof needs to meet the practical requirements of miniaturization, conformality, low cost and low loss, it is important for the whole RFID system to optimize the design thereof.

At present, bandwidths of RFID tag antennas used in various regions are inconsistent with each other in the high-frequency ranges thereof. For example, a band of 866~868 MHz is employed in the Europe, and a band of 902~928 MHz is employed in the United States. When the RFID tag antenna is switched between the different bandwidths in the above different regions, the conventional RFID tag antenna is very difficult to be identified in the regions with different bandwidths due to bandwidth limitations. Moreover, a resonant frequency is lower than 910 MHz according the conventional RFID tag antennas, so that a reading distance is significantly poor. In order to achieve a good identification effect, it is necessary to increase the thickness, the length and the width of the conventional RFID tag antenna, which results that an outline dimension of the RFID tag antenna is increased and costs are increased accordingly.

Therefore, a novel RFID tag antenna with ultra-thin dual-frequency micro strip patch antenna array, which has compatibility and is capable of identification over a long distance, becomes a development direction for production in this field.

SUMMARY

The present disclosure is based on a RFID tag antenna with ultra-thin dual-frequency micro strip patch antenna array which is designed with 1 mm or less of a thickness of the RFID tag antenna. An objective of the present disclosure is to provide a RFID tag antenna with ultra-thin dual-frequency micro strip patch antenna array which has properties of miniaturization, low loss, and identifiable over a long distance.

The present disclosure provides a RFID tag antenna with ultra-thin dual-frequency micro strip patch antenna array including: a radiation units array, a substrate and a substrate base plate, the radiation units array has a chip located at a center of the radiation units array, the radiation units array is configured to have a first radiation unit, a second radiation unit, a third radiation unit and a fourth radiation unit which are asymmetrically distributed around the chip.

Based on the above, in the present disclosure, the asymmetric distribution is that the radiation unit and the fourth radiation unit of the radiation units array are located at one side of the chip, and the second radiation unit and the third radiation unit are located at the other side, which is opposite to the one side, of the chip.

Based on the above, in the present disclosure, the asymmetric distribution is that the radiation unit and the third radiation unit are distributed at about two ends of a diagonal of the chip, and the radiation unit and the fourth radiation unit are distributed at about two ends of another diagonal of the chip.

Based on the above, in the present disclosure, the radiation unit and the third radiation unit are configured to form a low-frequency resonant system of the RFID tag antenna, and the radiation unit and the fourth radiation unit are configured to form a high-frequency resonant system of the RFID tag antenna.

Based on the above, in the present disclosure, the radiation units array is configured to have isolation units.

Based on the above, in the present disclosure, a first isolation unit is configured to be provided between the radiation unit and the fourth radiation unit of the radiation units array.

Based on the above, in the present disclosure, a second isolation unit is configured to be provided between the radiation unit and the third radiation unit.

Based on the above, in the present disclosure, the substrate is configured to have a short circuit structure.

Based on the above, in the present disclosure, the short circuit structure may be short circuit surface located at both sides of the substrate, or a conductive through hole provided though the substrate.

The present disclosure has the following advantageous. The incompatibility between the RFID tag antennas the long-distance reading and writing issue of the RFID tag antennas caused by miniaturization of the RFID tag antennas and different frequencies in various regions and can be solved. The present disclosure is designed based on an ultra-thin medium with 1 mm or less, its performance is outstanding compared to other features, and bandwidth of the RFID tag antenna is increased, such that the RFID tag antenna of the present disclosure may be used in wider bandwidth.

DETAILED DESCRIPTION

Hereinafter, the specific embodiments of the present disclosure are described in detail with reference to the accompany drawings.

Figure 1:
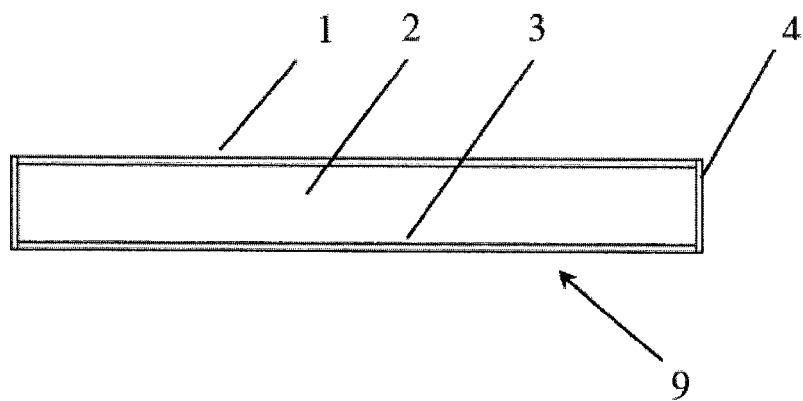
FIG. 1 is a schematic view showing a RFID tag antenna structure of the present disclosure.
Figure 2:
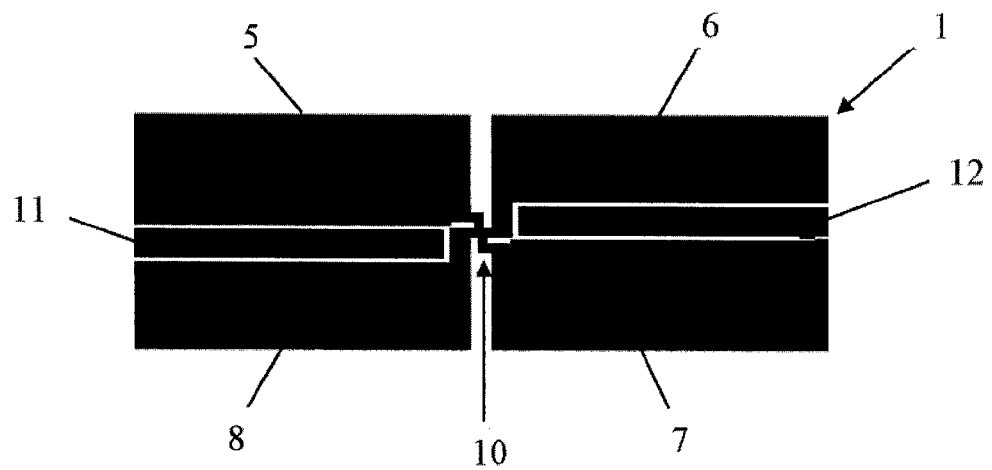
FIG. 2 is a schematic view showing a radiation units array of the RFID tag antenna structure of the present disclosure.

Referring to FIG. 1 and FIG. 2, a RFID tag antenna 9 with ultra-thin dual-frequency micro strip patch antenna array has a substrate 2, a radiation units array 1 attached to an upper surface of the substrate 2, a substrate base plate 3 attached to a lower surface of the substrate 2, and a chip 10 located in a center of the radiation units array. Both sides of the substrate 2 have short circuit surface 4.

The radiation units array 1 of the present disclosure has four co-polarized asymmetrical radiation units to form an antenna array. The four radiation units are all linear poles in a same direction. A first radiation unit 5 and a fourth radiation unit 8, which are configured to form a part of the radiation units array 1, are located at one side of the chip 10; and a second radiation unit 6 and a third radiation unit 7, which are configured to form a part of the radiation units array 1, are located at another side of the chip 10. The radiation unit 5 and the third radiation unit 7 are distributed symmetrically in respect to a diagonal of the chip 10, and the radiation unit 6 and the fourth radiation unit 8 are distributed symmetrically in respect to a diagonal of the chip 10. The radiation units configured to form the radiation units array are distributed around the chip 10 in an asymmetrical manner. Specifically, the radiation unit 5 and the third radiation unit 7 are of the same structure and are configured to form a low-frequency resonant system of the RFID tag antenna 9 with ultra-thin dual-frequency micro strip patch antenna array of the present disclosure, so as to accommodate a working frequency band for tag antennas in Europe; and the second radiation unit 6 and the fourth radiation unit 8 are of the same structure and are configured to form a high-frequency resonant system of the RFID tag antenna 9 with ultra-thin dual-frequency micro strip patch antenna array of the present disclosure, so as to accommodate a working frequency band for tag antennas in U.S., thereby enabling the RFID tag antenna 9 with ultra-thin dual-frequency micro strip patch antenna array of the present disclosure to be compatible with both the working frequencies in Europe and U.S., and thus achieving a dual-frequency-band property. This embodiment intends to illustrate the asymmetric structure of the present disclosure, and the asymmetric distribution manner of the radiation units of the present disclosure is not limited thereto. In other asymmetric structures, the first radiation unit 5 and the third radiation unit 7 configured to form the low-frequency resonance system may be located at two sides of the chip 10, but both of them are provided at an upper side or in a lower side; while the second radiation unit 6 and the four radiation unit 8 configured to form the high-frequency resonance system may be located at two sides of the chip 10, but both of them are provided at an lower side or in a upper side. That is, the position of the second radiation unit 6 and that of the third radiation unit 7 described in the previous embodiment are replaced with each other, so as to form a up-down asymmetric radiation units array. Meanwhile, the radiation units array of the present disclosure may also fine adjust a resonant frequency of the RFID tag antenna 9 with ultra-thin dual-frequency micro strip patch antenna array by adjusting defect sizes of the radiation units, i.e., to adjust area of the radiation units. The adjusting the defect sizes of the radiation units mentioned herein may be realized by adjusting sizes of the formed radiation units.

The above embodiment is illustrated with an example of an asymmetric structure of four radiation units of the RFID tag antenna 9 with ultra-thin dual-frequency micro strip patch antenna array, and is not intended to limit the structure of the radiation units antenna array of the present disclosure which may have six units array or eight units array or the like as desired in practice.

Hereinafter, an advantageous effect of the RFID tag antenna 9 with ultra-thin dual-frequency micro strip patch antenna array of the present disclosure having four radiation units array will be illustrated with reference to experimental data in Table 1.

TABLE 1

| two cases | resonant frequency f1 (MHz) | S11 parameter (f1) | gain G1 (dB) (f1) | resonant frequency f2 (MHz) | S11 parameter (f2) | gain G1 (dB) (f2) |
|---|---|---|---|---|---|---|
| asymmetric structure with four units | 866 | −40 | −7.6 | 915 | −55 | −7.4 |
| other symmetric slotting structures | 866 | −15 | −8.5 | 917 | −45 | −7.6 |

As can be seen from Table 1, a difference between the S11 parameter is 30 in a case that a RFID tag antenna with a conventional symmetric structure or slotting structure is respectively applied to 866 MHz in the European standard and 910 MHz in the American standard. The S11 parameter is a reflection coefficient which reflects an impedance matching degree between the chip and the RFID tag antenna. The S11 parameter is smaller, the matching degree is better, and thus the energy transmission is greater. According to Table 1, the S11 parameter of the conventional RFID tag antenna is higher than that of the four-radiation-units-array RFID tag antenna 9 with asymmetric structure of radiation units array and an ultra-thin dual-frequency micro strip patch antenna array of the present disclosure, and is difficult to keep a consistent level. Additionally, the gain of the conventional RFID tag antenna is less than that of the RFID tag antenna 9 with four radiation units array and an ultra-thin dual-frequency micro strip patch antenna array of the present disclosure. When respectively being applied to 866 MHz in the European standard and 910 MHz in the American standard, the RFID tag antenna 9 with four radiation units array and an ultra-thin dual-frequency micro strip patch antenna array of the present disclosure may keep an excellently stable S11 parameter under both of the resonant frequencies, and has higher gains G than the conventional FRID tag antenna.

As another embodiment of the present disclosure, the radiation units array 1 of the RFID tag antenna 9 with ultra-thin dual-frequency micro strip patch antenna array of the present disclosure has isolation units. A first isolation unit 11 is disposed between the first radiation unit 5 and the fourth radiation unit 8 to reduce coupling between the first radiation unit 5 and the fourth radiation unit 8; and a second isolation unit 12 is disposed between the second radiation unit 6 and the third radiation unit 7 to reduce coupling between the second radiation unit 6 and the third radiation unit 7, thereby improving the gain of the RFID tag antenna 9 with ultra-thin dual-frequency micro strip patch antenna array. The above four radiation units and two isolation units together form the four unit antenna array.

Hereinafter, an advantageous effect of the RFID tag antenna 9 with isolation units and an ultra-thin dual-frequency micro strip patch antenna array of the present disclosure will be illustrated with reference to experimental data in Table 2.

TABLE 2

| two cases | resonant frequency f1 (MHz) | gain G1 (dB) | resonant frequency f2 (MHz) | gain G2 (dB) |
|---|---|---|---|---|
| with isolation units | 867 | −7.6 | 915 | −7.4 |
| without isolation units | 870 | −8.4 | 917 | −8.3 |

As can be seen from Table 2, after the isolation units 11 and 12 are applied to the RFID tag antenna 9 with ultra-thin dual-frequency micro strip patch antenna array of the present disclosure, the gain G1 is increased by 0.8 db when the similar resonant frequency is 867~870 MHz, and the gain G2 is increased by 0.9 db when the similar resonant frequency is 915~917 MHz, compared to the case without isolation unit.

A reading distance r of a tag antenna is generally determined according to a formula (1):

$$r_{max} = \sqrt{\frac{EIRP \cdot G_{tag} \cdot \lambda^2}{(4\pi)^2 \cdot P_{min}} \cdot \eta} \qquad \text{formula (1)}$$

wherein, rmax is a maximum reading distance, EIRP is an equivalent isotropic radiation power, Gtag is a gain of the tag antenna, $\lambda$ is a wavelength of an electromagnetic wave in vacuum, $\eta$ is a loss factor, and Pmin is a sensitivity of the tag chip. It can be seen that the greater the gain of the tag is, the longer the reading distance is. By substituting the gain data in the above Table 2 into the formula (1), it is obvious that the RFID tag antenna 9 with isolations units and an ultra-thin dual-frequency micro strip patch antenna array of the present disclosure increases the reading distance by about 35%, compared to the RFID tag antenna without isolation unit.

In addition, the RFID tag antenna 9 with ultra-thin dual-frequency micro strip patch antenna array of the present disclosure also has the short circuit surface 4 which is disposed at both sides of the substrate and connects the radiation units to the substrate base plate 3 so as to realize a short circuit effect, therefore the resonant frequency of the tag antenna is effectively reduced and thus the size of the antenna is reduced. The short circuit surface is an exemplary embodiment for illustrating the solutions of the disclosure, and is not indented to limit the disclosure. The short circuit structure adopted by the present disclosure may be a conductive through hole formed on the substrate, and the short circuit may be performed through connecting the radiation units with conductive metal of the conductive through hole.

Hereinafter, an advantageous effect of the RFID tag antenna 9 with the short circuit surface 4 and an ultra-thin dual-frequency micro strip patch antenna array of the present disclosure will be illustrated with reference to experimental data in Table 3.

TABLE 3

| two cases | resonant frequency f1 (MHz) | resonant frequency f2 (MHz) |
|---|---|---|
| with short circuit | 867 | 915 |
| without short circuit | 1745 | 1800 |

Table 3 shows the comparison between the case with short circuit in the bottom metal plate and the case without short circuit, in a case that the structure and size of the single radiation unit of the antenna is the same. It can be seen from Table 3 that the resonant frequency of the RFID tag antenna 9 with the short circuit surface and an ultra-thin dual-frequency micro strip patch antenna array is significantly lower than that of the RFID tag antenna without short circuit surface.

In the art, a radiation frequency and a wavelength has a relationship shown in a formula (2):

$$\lambda = \frac{C}{f\sqrt{\varepsilon_r}} \qquad \text{formula (2)}$$

wherein, C is a speed of light, $\varepsilon_r$ is a relative dielectric constant, f is a resonant frequency, and $\lambda$ is a wavelength.

It can be seen from the formula (2), the resonant frequency f is inversely proportional to the wavelength $\lambda$, and both of the two parameters are relevant to the size of the radiation unit of the RFID tag antenna. According to the principle for designing a RFID tag antenna, the size of the RFID tag antenna should be ¼ wavelength or ½ wavelength. The wavelength $\lambda$ is increased as the frequency f is decreased. Therefore, the size of the designed RFID tag antenna is also increased. According to Table 3, the resonant frequency of the RFID tag antenna 9 with ultra-thin dual-frequency micro strip patch antenna array but without short circuit surface is 1745 or 1800 MHz, while the resonant frequency of the RFID tag antenna 9 with the short circuit surface and ultra-thin dual-frequency micro strip patch antenna array is only 867 or 915 MHz. By substituting the resonant frequencies into the formula (2), it can be seen that after the short circuit surface 4 is provided on the RFID tag antenna 9 with ultra-thin dual-frequency micro strip patch antenna array of the present disclosure, if the resonant frequency is about 910 MHz, the size of the tag antenna 9 is reduced by half compared to the size of the RFID tag antenna 9 with ultra-thin dual-frequency micro strip patch antenna array but without short circuit surface.

Hereinafter, an advantageous effect of the RFID tag antenna 9 with short circuit surface 4 and an ultra-thin dual-frequency micro strip patch antenna array of the present disclosure will be illustrated with reference to experimental data in Table 4.

TABLE 4

| two cases | resonant frequency f (MHz) | gain G (dB) |
|---|---|---|
| with antenna array | 915 | −5.86 |
| without antenna array | 915 | −9.07 |

Table 4 is a comparison between the RFID tag antenna of the present disclosure which has a four radiation units array and the RFID tag antenna without a radiation units array, in a case that the bottom radiation metal plate of the antenna has short circuit surface.

It is obvious from the data in Table 4 that the gain of the RFID tag antenna 9 with the radiation units array 1 and an ultra-thin dual-frequency micro strip patch antenna array of the present disclosure is at least 3 db, at 915 MHz of the resonant frequency, greater than that of the RFID tag antenna without a radiation units array. It can be obtained from the above formula (1) that the reading distance of the RFID tag antenna 9 with ultra-thin dual-frequency micro strip patch antenna array of the present disclosure is nearly doubled, compared to the RFID tag antenna without radiation units array.

Based on the embodiments discussed above, the incompatibility between the RFID tag antennas and the long-distance reading and writing issue of the RFID tag antennas caused by miniaturization of the RFID tag antennas and different frequencies in various regions can be solved by the present disclosure through utilizing an asymmetric array of radiation units. The present disclosure is designed based on an ultra-thin medium with 1 mm or less, its performance is outstanding compared to other features, and bandwidth of the RFID tag antenna is increased, such that the RFID tag antenna of the present disclosure may be used in wider bandwidth.

The above is merely a description and drawings of the exemplary embodiments of the present disclosure. The features of the present disclosure are not limited thereto. All the embodiments in consistent with the spirit of the claims of the present disclosure and other similar variations will be covered by the present disclosure. The obvious variations and modifications by those skilled in the art fall into the protection scope of the claims of the present disclosure.

What is claimed is:

1. A Radio Frequency Identification (RFID) tag antenna with an ultra-thin dual-frequency micro strip patch antenna array, comprising:
    a radiation units array, the radiation units array comprising a chip located at a center of the radiation units array;
    a substrate; and
    a substrate base plate
    wherein the radiation units array comprises a first radiation unit, a second radiation unit, a third radiation unit and a fourth radiation unit,
    wherein the first radiation unit, the second radiation unit, the third radiation unit and the fourth radiation unit are asymmetrically distributed around the chip, and
    wherein the first radiation unit, the second radiation unit, the third radiation unit and the fourth radiation unit are four separate radiation units, which operate separately and the positions of which are interchangeable.

2. The RFID tag antenna of claim 1, wherein the asymmetric distribution is that the first radiation unit and the fourth radiation unit are located at one side of the chip, and the second radiation unit and the third radiation unit are located at the other side, which is opposite to the one side, of the chip.

3. The RFID tag antenna of claim 1, wherein:
    the asymmetric distribution is that the first radiation unit and the third radiation unit are respectively distributed at about two ends of a diagonal of the chip, and the second radiation unit and the fourth radiation unit are respectively distributed at about two ends of another diagonal of the chip; or
    the asymmetric distribution is that the first radiation unit and the third radiation unit are distributed symmetrically with respect to the diagonal of the chip, and the second radiation unit and the fourth radiation unit are distributed symmetrically with respect to the diagonal of the chip.

4. The RFID tag antenna of claim 1, wherein the first radiation unit and the third radiation unit are configured to form a low-frequency resonant system of the RFID tag antenna, and the second radiation unit and the fourth radiation unit are configured to form a high-frequency resonant system of the RFID tag antenna.

5. The RFID tag antenna of claim 1, wherein the radiation units array comprises a plurality of isolation units.

6. The RFID tag antenna of claim 5, wherein the radiation units array comprises: a first isolation unit between the first radiation unit and the fourth radiation unit for reducing coupling between the first radiation unit and the fourth radiation unit; and a second isolation unit between the second radiation unit and the third radiation unit for reducing coupling between the second radiation unit and the third radiation unit.

7. The RFID tag antenna of claim 5, wherein the radiation units array is configured to finely adjust a resonant frequency of the RFID tag antenna by changing defect sizes of the radiation units in the radiation units array.

8. The RFID tag antenna of claim 1, wherein the substrate comprises a short circuit structure.

9. The RFID tag antenna of claim 8, wherein the short circuit structure comprises a short circuit surface located at both sides of the substrate, or a conductive through hole provided though the substrate.

10. The RFID tag antenna of claim 2, wherein the first radiation unit and the third radiation unit are configured to form a low-frequency resonant system of the RFID tag antenna, and the second radiation unit and the fourth radiation unit are configured to form a high-frequency resonant system of the RFID tag antenna.

11. The RFID tag antenna of claim 3, wherein the first radiation unit and the third radiation unit are configured to form a low-frequency resonant system of the RFID tag antenna, and the second radiation unit and the fourth radiation unit are configured to form a high-frequency resonant system of the RFID tag antenna.

* * * * *